(12) United States Patent
Le Merrer et al.

(10) Patent No.: US 10,196,024 B2
(45) Date of Patent: Feb. 5, 2019

(54) SYSTEM FOR CONTROLLING THE DEPLOYMENT OF AN EXTERNAL SAFETY DEVICE

(71) Applicants: Autoliv Development AB, Vårgårda (SE); Yann Le Merrer, Paris (FR); Aurore Loisy, Villers sur Trie (FR); Alexandre Mensales, Groslay (FR)

(72) Inventors: Yann Le Merrer, Paris (FR); Aurore Loisy, Villers sur Trie (FR); Alexandre Mensales, Groslay (FR)

(73) Assignee: VEONEER SWEDEN AB, Vargarda (SE)

( * ) Notice: Subject to any disclaimer, the term of this patent is extended or adjusted under 35 U.S.C. 154(b) by 0 days.

(21) Appl. No.: 14/912,721

(22) PCT Filed: Sep. 5, 2013

(86) PCT No.: PCT/SE2013/051035
§ 371 (c)(1),
(2) Date: Feb. 18, 2016

(87) PCT Pub. No.: WO2015/034406
PCT Pub. Date: Mar. 12, 2015

(65) Prior Publication Data
US 2016/0200275 A1    Jul. 14, 2016

(51) Int. Cl.
*B60R 21/0134* (2006.01)
*B60R 21/36* (2011.01)
*B60R 21/01* (2006.01)

(52) U.S. Cl.
CPC .......... *B60R 21/0134* (2013.01); *B60R 21/36* (2013.01); *B60R 2021/01286* (2013.01)

(58) Field of Classification Search
CPC . B60R 21/0134; B60R 21/0136; B60R 21/34; B60R 21/36; B60R 21/38;
(Continued)

(56) References Cited

U.S. PATENT DOCUMENTS 6,329,910 B1 * 12/2001 Farrington .......... B60R 21/0136
                                                180/282
7,424,179 B2 *  9/2008 Ohtaka ............... B60R 21/0136
                                                180/274
(Continued)

FOREIGN PATENT DOCUMENTS

DE   10 2005 005 959 A1    8/2006
EP      2 256 007 A1      12/2010
(Continued)

OTHER PUBLICATIONS

PCT International Search Report—May 7, 2014.
Japanese Office Action dated Feb. 7, 2018.

*Primary Examiner* — Richard A Goldman
(74) *Attorney, Agent, or Firm* — Brinks Gilson & Lione

(57) ABSTRACT

A vehicle safety system having an external safety system for protecting a pedestrian, and a device for activating the external safety system the device being connected to a pre-crash sensor system (10, 11) and an in-crash sensor system (16). The device is arranged to perform an object classification of a first signal from the pre-crash sensor system and to determine a threshold (T1, T2) for the in-crash sensor system as a function of the object classification.

35 Claims, 4 Drawing Sheets

(58) Field of Classification Search
CPC ........ B60R 2021/01286; B60R 21/343; B60R 21/346; B60T 7/22; B60T 8/17558; B60W 2420/52
USPC ............ 701/45; 340/436, 435, 903; 180/274
See application file for complete search history.

(56) References Cited

U.S. PATENT DOCUMENTS

| | | | |
|---|---|---|---|
| 7,805,230 B2* | 9/2010 | Groeger | B60R 21/0134 701/45 |
| 8,751,113 B2* | 6/2014 | Foo | B60R 21/013 701/45 |
| 9,381,882 B2* | 7/2016 | Kim | B60R 21/36 |
| 2007/0045026 A1* | 3/2007 | Theisen | B60R 21/0136 180/274 |
| 2007/0145193 A1* | 6/2007 | Hakki | B64D 17/80 244/139 |
| 2008/0046150 A1* | 2/2008 | Breed | B60R 21/0134 701/45 |
| 2009/0326766 A1* | 12/2009 | Wang | B60R 21/0134 701/46 |
| 2012/0035846 A1* | 2/2012 | Sakamoto | B60T 8/17558 701/301 |
| 2013/0124050 A1* | 5/2013 | Jo | B60R 21/0134 701/45 |
| 2016/0152208 A1* | 6/2016 | Ewert | B60R 21/0134 701/46 |
| 2016/0200275 A1* | 7/2016 | Le Merrer | B60R 21/0134 701/45 |

FOREIGN PATENT DOCUMENTS

| | | |
|---|---|---|
| EP | 2 679 450 A1 | 1/2014 |
| JP | 2004291929 A | 10/2004 |
| JP | 2006240579 A | 9/2006 |
| JP | 2009030368 A | 2/2009 |
| JP | 2010171500 A | 8/2010 |
| WO | WO 2007/067121 A1 | 6/2007 |

* cited by examiner

SYSTEM FOR CONTROLLING THE DEPLOYMENT OF AN EXTERNAL SAFETY DEVICE

CROSS REFERENCE TO RELATED APPLICATIONS

This application claims priority to PCT International Application No. PCT/SE2013/051035, filed on Sep. 5, 2013.

FIELD OF THE INVENTION

The present invention relates to a system for sensing a motor vehicle impact and adjusting the deployment of an external safety device.

BACKGROUND

Today, many vehicles are constructed to include at least one exterior airbag, intended to be inflated in the case of a collision with moving objects, such as pedestrians, cyclists or animals and to alleviate the collision force that the moving object is subjected to.

In order to further minimize the damages afflicted to the moving object in the event of such an impact, it has been proposed to use some kind of hood lifting arrangements. These arrangements are generally constructed so that the rear part of the hood, i.e. the part closest to the windscreen, is lifted in the event of a collision with a moving object. Arrangements of this type are disclosed in for example W02007/067121 and EP2256007.

For any external airbag system to operate properly, a robust sensing system is necessary. Unlike crash sensors which trigger deployment while the vehicle is crushing and decelerating, the sensing system for an external airbag may anticipate an impact before it has occurred. This critical "Time Before Collision" is related to the time to deploy the actuator (e.g. 30-200 ms) and the clearance distance in front of the vehicle (e.g. 100-800 mm). Inadvertent deployment is not only costly but may temporarily disable the vehicle. Moreover, since the deployment of an airbag is achieved through a release of energy, deployment at an inappropriate time may result in undesirable effects. This invention is related to a sensing system for an external airbag safety system which addresses these design concerns.

Radar and ultrasonic detection systems have been studied and employed for motor vehicles for many years. Radar systems for motor vehicles operate in that a radio frequency signal, typically in the microwave region, is emitted from an antenna on the vehicle and the reflected-back signal is analysed to reveal information about the reflecting target. Such systems have been considered for use in active braking systems for motor vehicles, as well as obstacle detection systems for vehicle drivers. Radar sensing systems also have applicability in deploying external airbags. Radar sensors provide a number of valuable inputs, including the ability to detect the range to the closest object with a high degree of accuracy (e.g. 5 cm). They can also provide an output enabling measurement of closing velocity to a target with high accuracy. The radar cross section of the target and the characteristics of the return signal may also be used as a means of characterizing and identifying moving objects.

An alternative means for detecting and identifying moving objects is a vision system having one or more video cameras used for detecting objects. A vision system for a vehicle identifies and classifies objects located proximate a vehicle. The system includes a sensor array that produces imagery that is processed to generate depth maps of the scene proximate a vehicle. The depth maps are processed and compared to pre-rendered templates of target objects that could appear proximate the vehicle. A target list is produced by matching the pre-rendered templates to the depth map imagery. The system processes the target list to produce target size and classification estimates. The target is then tracked as it moves near a vehicle and the target position, classification and velocity are determined. A further alternative object detection system for a vehicle includes an infrared camera for gathering an image of at least a part of the surroundings of the vehicle; and a processor for applying an algorithm to at least a part of the image gathered by the camera, the algorithm identifying non-relevant hot or warm objects detected by the camera and reducing the brightness and/or distinctiveness of the non-relevant objects in the image.

A classification system is used for classifying objects in the vicinity of a vehicle. The system typically includes a video/infrared camera for gathering camera data, a reflected radiation system for gathering reflected radiation data, and a classifier. Raw data from the video/infrared camera and the reflected radiation system can be combined and analysed by the classifier, the classifier being configured to provide an output relating to the type of an object that appears in data gathered by both the camera and the reflected radiation system.

Existing object classifiers include computer programs which are operable to analyse data from a vehicle sensor, such as a camera or radar system. The classifier is trained with exposure to many different types of object in different circumstances, so that the program is able to make an accurate determination as to the type of a new kind of object that is detected. Known types of objects can be stored in a database for future reference. In the subsequent text, the term "pre-crash sensor" will be used for vehicle sensors hsving a camera or a radar/ultrasonic system.

A vehicle is also provided with one or more contact sensors, such as accelerometers or pressure sensors, for detecting an actual impact. In the subsequent text, the term "in-crash sensor" will also be used for this type of contact sensors. Modern vehicles can be provided with 5-10 contact sensors across a front bumper or similar suitable portion of the vehicle.

When it is determined by vehicle crash sensors that an impact is imminent, or that crash is occurring, one or more of these external safety systems may be deployed, or a safety system may be deployed in one of a plurality of possible modes, depending in part upon the type of the other object that is involved. If it appears that the vehicle is about to strike a pedestrian, then the external safety system in the form of an external air-bag and/or a bonnet (hood) lifter may be activated, but if the vehicle is about to strike an inanimate object such as a tree, then there is no need for these protection systems to be deployed. Accurate classification of objects in the vicinity of a vehicle is therefore desirable for vehicle safety systems to be activated in the most appropriate manner.

Although information obtained from pre-crash sensors yield valuable data, exclusive reliance upon a pre-crash sensor signal for deploying an external airbag has certain negative consequences. As mentioned previously, deployment of the external airbag is a significant event and should only occur when needed in an impending impact situation. Pre-crash sensors are prone to "false-positive" (FP) indications. These are typically due to phenomena such as a ground reflection, projection of small objects, and software misinterpretation, which faults are also referred to as "fooling" and "ghosting". For example, a small metal object with a reflector type geometry can return as much energy as a small car and as such can generate a collision signal in the radar even when the object is too small to damage the vehicle in a substantial way. Also, there may be "near miss" situations where a target is traveling fast enough to avoid collision, yet the pre-crash sensor would provide a triggering signal for the external safety system.

The relative speed is a measure for the classification of objects. It can be used to establish, for example, whether the relevant object is at rest or whether it moves at a certain speed. Since pedestrians, for example, only have limited maximum speed, it is easy to distinguish pedestrians from vehicles. This may then be used in particular also to take into account the severity of an accident. Thus this makes it possible for the device according to the present invention to be able to make a triggering decision for the actuator system on the basis of speed. With the aid of speed information, the impact signal becomes easier to differentiate as to whether it involves a pedestrian, a cyclist or another object. Including the speed thus helps to prevent a false triggering of the actuator system. Overall this results in a more precise evaluation of the impact signal, that is, the signal from the contact sensor system. For example, a fast and light object may provide a similar impact signal as a slow and heavy object. This shows that the knowledge of the speed expands the decision space by a dimension such that a classification of the different objects is improved and thereby also the decision for triggering the actuator system. In the subsequent text, the term "pedestrian" should be interpreted as including any moving object for which the external safety system is suitable, i.e. pedestrians and cyclists, as well as animals.

SUMMARY AND INTRODUCTORY DESCRIPTION

The above-referenced object is achieved by means of a vehicle safety system having an external safety system for protecting a pedestrian and a device for activating the external safety system. The device is connected to a pre-crash sensor system and an in-crash sensor system and is arranged to perform an object classification of a first signal from the pre-crash sensor system. The device then determines a threshold for the in-crash sensor system as a function of the object classification.

According to the invention, the device is arranged to set a first threshold, lower than a nominal threshold, as a function of a first signal indicating an object classified as a pedestrian. In this context, the nominal threshold is a stored threshold that is used by the device when no input is available from the active sensor systems.

The device is arranged to set a second threshold, higher than the nominal threshold, as a function of a first signal indicating an object classified as a non-pedestrian;

Further, the device is arranged to interpolate the set threshold between the nominal threshold and a threshold limit value as a function of the probability of accurate classification for the first signal.

The device is arranged to compare a second signal from the in-crash sensor system with the set threshold, whereby the external safety system is activated if the set threshold is exceeded.

In this context, the device can set a first threshold interpolated between the nominal threshold and a minimum value, if the classification indicates that it is probable that an object classified as a pedestrian has been detected. Similarly, the device can set a second threshold interpolated between the nominal threshold and a maximum value, if the classification indicates that it is probable that an object classified as a non-pedestrian has been detected.

According to a first alternative example, the device is arranged to set a first threshold equal to a minimum threshold limit value if the probability of accurate classification has a maximum value, as a function of the first signal indicating that an object classified as a pedestrian is detected.

According to a second alternative example, the device is arranged to set a first threshold higher than the minimum threshold limit value if the probability of accurate classification is between a minimum and a maximum value, as a function of the first signal indicating no object or that an object classified as a possible pedestrian is detected.

According to a third alternative example, the device is arranged to set a second threshold equal to a maximum threshold limit value if the probability of accurate classification has a maximum value, as a function of the first signal indicating that an object classified as a non-pedestrian is detected.

According to a fourth alternative example, the device is arranged to set a second threshold lower than the maximum threshold limit value if the probability of accurate classification between a minimum and a maximum value, as a function of the first signal (A1) indicating that an object classified as a possible non-pedestrian is detected.

According to a fifth alternative example the device is arranged to set a threshold equal to the nominal threshold, as a function of a first signal indicating that no input is available from the pre-crash sensor or pre-crash sensor failure. This situation can occur, for instance, for a sensor which can only detect some types of objects but does not have a generic object classification, like a mono-vision system. In such a case, the input from the in-crash sensors will be decisive for the triggering of the external safety system.

According to a further alternative example, the device is arranged to set a threshold equal to a minimum threshold limit value, as a function of a first signal indicating no object detected. This situation can occur, for instance, for a sensor where any object impacting the car will normally be seen, such as a radar system. For such systems, a standing object in the path of the vehicle is very likely to be seen. However, because such sensors have a limited field of view, a moving target passing in front of the vehicle may be hit before being detected by a sensor. In this case, it can be assumed that if the object was not seen, it is because it has moved out in front of the vehicle. Such an object is likely to be a pedestrian. Therefore a threshold equal to a minimum threshold limit value should be set.

For the vehicle safety system described above, the probability of accurate classification can be a function of the first signal and at least one additional detected vehicle related parameter. Examples of suitable vehicle related parameters are a detected brake actuation, such as the degree of brake actuation performed by the driver or an automatic system, and/or a detected steering wheel actuation, such as the rate of change of steering wheel angle.

The threshold set by the above vehicle safety system device can be a linear function of the probability of accurate classification between the maximum and minimum threshold limit values. Further, the probability of accurate classification is a function of the sensors confidence level.

The sensor confidence level includes generic information broadcast along with any signal from the sensor, and represents which confidence the signal provider has on the information to be accurate. For example, the vehicle speed provided on a CAN bus in the vehicle has a confidence level: if some of the ABS wheel speeds are not available from the respective speed sensors, the speed can still be estimated but less precisely. In this case the confidence level can be decrease to warn the other systems using this information that the input signal is less accurate than usual. Hence, the confidence level is an inherent property of the sensor. In the specific case of a pre-crash sensor, the confidence level can be based on environmental conditions (rain, snow, ambient light) or sensor diagnostics.

The vehicle safety system as described above includes a pre-crash sensor system has a field of view less than 180°. Also, the external safety system includes multiple pyrotechnic components arranged to be activated sequentially. The external safety system can include at least a pyrotechnic hood lifter and/or at least one pedestrian protection airbag.

The external safety system includes two or more zones provided with a pre-crash sensor system. The combined field of view for the two or more zones is less than 180°. Further, the device is arranged to determine individual thresholds for each zone, as a function of a first signal from the pre-crash sensor system. The external safety system in each zone is preferably, but not necessarily, activated individually if the first or second set threshold is exceeded.

The invention further relates to a device for activating an external safety system for protecting a pedestrian. The device is connected to a pre-crash sensor system and an in-crash sensor system. The device includes:
  an arrangement for performing an object classification of a first signal from the pre-crash sensor system;
  an arrangement for determining a threshold for the in-crash sensor system as a function of the object classification;
  an arrangement for setting a first threshold, lower than a nominal threshold, as a function of a first signal indicating no object detected or an object classified as a pedestrian;
  an arrangement for setting a second threshold, higher than the nominal threshold, as a function of a first signal indicating an object classified as a non-pedestrian; an arrangement for interpolating the set threshold between the nominal threshold and a threshold limit value as a function of the probability of accurate classification for the first signal and
  an arrangement for comparing a second signal from the in-crash sensor system with the threshold, the device being activated if the threshold is exceeded.

According to a first alternative example, the device includes an arrangement for setting a first threshold equal to a minimum threshold limit value if the probability of accurate classification has a maximum value, as a function of the first signal indicating that an object classified as a pedestrian is detected.

According to a second alternative example, the device includes an arrangement for setting a first threshold higher than the minimum threshold limit value if the probability of accurate classification is below the maximum value, as a function of the first signal indicating no object or that an object classified as a possible pedestrian is detected.

According to a third alternative example, the device includes an arrangement for setting a second threshold equal to a maximum threshold limit value if the probability of accurate classification has a maximum value, as a function of the first signal indicating that an object classified as a non-pedestrian is detected.

According to a fourth alternative example, the device includes an arrangement for setting a second threshold lower than the maximum threshold limit value if the probability of accurate classification has a maximum value, as a function of the first signal indicating that an object classified as a possible non-pedestrian is detected.

The invention further relates to a method for activating an external safety system for protecting a pedestrian, which system includes a device for activating the external safety system. The device being connected to a pre-crash sensor system and an in-crash sensor system and is arranged to perform an object classification of a first signal from the pre-crash sensor system.

The method involves the steps of:
  performing an object classification of a first signal from the pre-crash sensor system;
  determining a threshold for the in-crash sensor system as a function of the object classification;
  setting a first threshold, lower than a nominal threshold, as a function of a first signal indicating no object detected or an object classified as a pedestrian;
  setting a second threshold, higher than the nominal threshold, as a function of a first signal indicating an object classified as a non-pedestrian;
  interpolating the set threshold between the nominal threshold and a threshold limit value as a function of the probability of accurate classification for the first signal; and
  comparing a second signal from the in-crash sensor system with the threshold and activating the device if the threshold is exceeded.

According to a first alternative example, the method involves setting a first threshold equal to a minimum threshold limit value if the probability of accurate classification has a maximum value, as a function of the first signal indicating that an object classified as a pedestrian is detected.

According to a second alternative example, the method involves setting a first threshold higher than the minimum threshold limit value if the probability of accurate classification is below the maximum value, as a function of the first signal indicating no object or that an object classified as a possible pedestrian is detected.

According to a third alternative example, the method involves setting a second threshold equal to a maximum threshold limit value if the probability of accurate classification has a maximum value, as a function of the first signal indicating that an object classified as a non-pedestrian is detected.

According to a fourth alternative example, the method involves setting a second threshold lower than the maximum threshold limit value if the probability of accurate classification has a maximum value, as a function of the first signal indicating that an object classified as a possible non-pedestrian is detected.

According to a fifth alternative example, the method involves setting a threshold equal to the nominal threshold, as a function of a first signal indicating no object detected or pre-crash sensor failure.

The method can further involve determining the probability of accurate classification as a function of the first signal and at least one additional detected vehicle related parameter. Examples of suitable vehicle related parameters are a detected brake actuation, such as the degree of brake actuation performed by the driver or an automatic system, and/or a detected steering wheel actuation, such as the rate of change of steering wheel angle.

The method can further involve determining the threshold as a linear function of the probability of accurate classification the first signal between maximum and minimum threshold limit values. In addition, the probability of accurate classification can be estimated as a function of the sensors confidence level.

The method can also be applied to an external safety system having two or more zones, each provided with an pre-crash sensor system, and performing an object classification of a first signal from the pre-crash sensor system. Using the above method it is possible to determine an individual threshold for each zone, as a function of a first signal from the pre-crash sensor system. In this way the external safety system in each zone can be activated individually if the set threshold is exceeded.

A number of advantages are obtained by means of the present invention. Mainly, a desired adjustable trigger threshold may be achieved regardless of driving style and context by adjusting system parameters based on an object classification of a first signal from the pre-crash sensor system and the probability of accurate classification for the first signal. This is preferable, since it optimizes driver comfort and provides real-life benefit, the number of trigger occasions being adjusted to not be disturbing while still providing confirmation of its existence and functionality.

The present invention aims to automatically adapt activation thresholds based on the probability of accurate classification for a signal representing a detected object.

BRIEF DESCRIPTION OF THE DRAWINGS

The present invention will now be described more in detail with reference to the appended drawings. These schematic drawings are used for illustration purposes only and do not in any way limit the scope of the invention. In the drawings.

DETAILED DESCRIPTION

Figure 1:
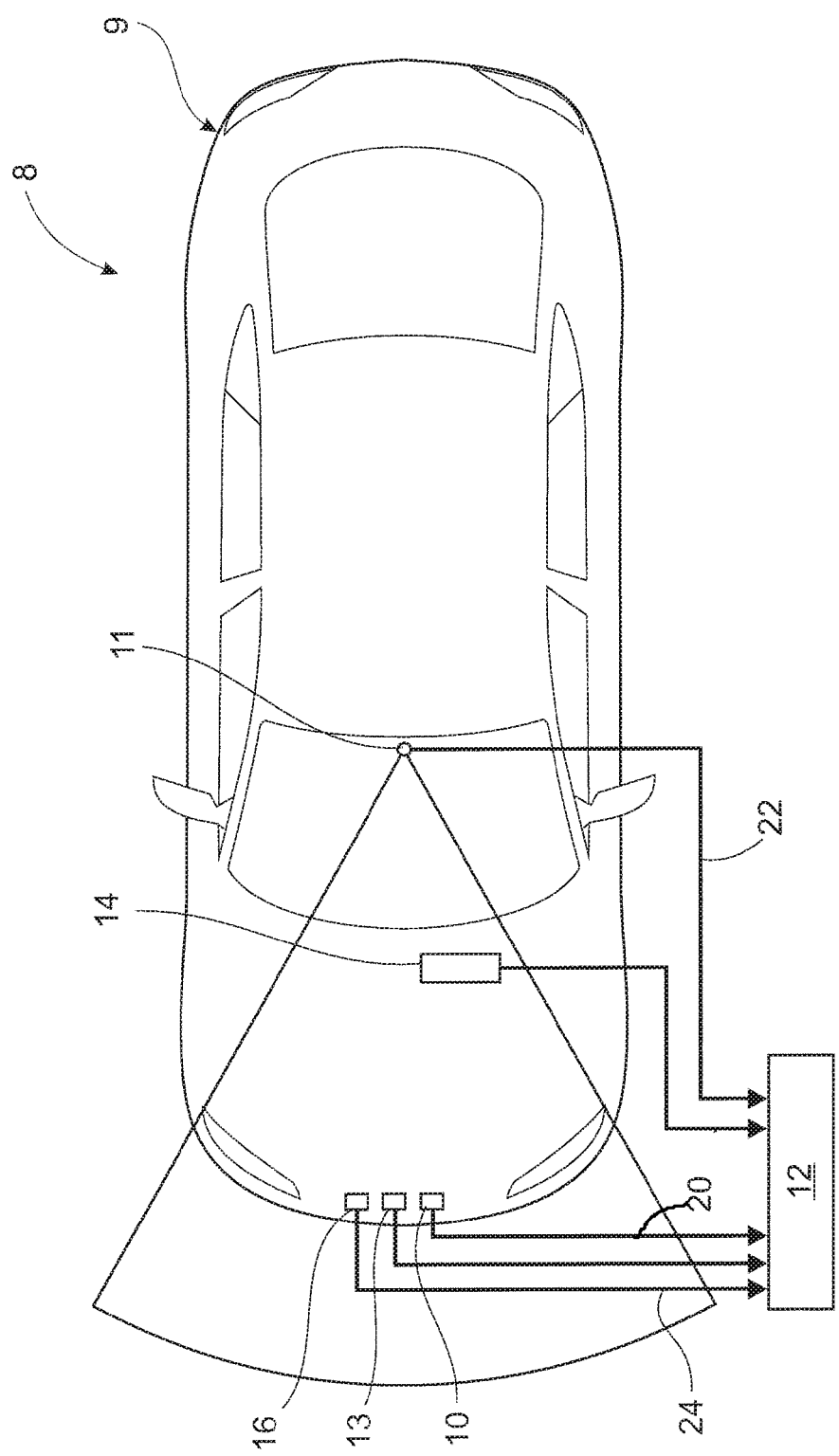
FIG. 1 shows a schematic plan view of a vehicle provided with a safety system according to the invention.

FIG. 1 shows a schematic plan view of a vehicle provided with a safety system according to the invention. In FIG. 1, a sensor system 8 is shown with an associated vehicle 9. The sensor system 8 is configured for a forward looking application and has the ability to sense an approaching object and prepare the vehicle 9 for an impact with a pedestrian, a cyclist or similar. In this example the application is shown with single sensors for radar and vision, respectively, but it is also possible to provide multiple sensors having overlapping fields of view.

The sensor system 8 includes a radar sensor 10 which receives a radio frequency signal, preferably in the microwave region emanating from an antenna (not shown). A radar sensor 10 provides radar output signal 20 to an electronic control module (ECM) 12. A vision sensor 11 is preferably mounted to an upper portion of the vehicle 9, such as, along the windshield header aimed forward to provide vision information. In this example, the field of view of the sensor 11 is less than 180°. The vision sensor 11 provides vision output signal 22 to the ECM 12.

The sensor system 8 further includes one or more contact sensors 16 (one shown), such as accelerometers or pressure sensors, for detecting an actual impact. The contact sensor 16 provides contact output signal 24 to the ECM 12. The contact sensors 16 are also referred to as in-crash sensors. The radar sensor 10 and the vision sensor 11 are also referred to as pre-crash sensors. The ECM 12 combines radar output signal 20 the vision output signal 22 and contact output signal 24 to determine if a collision is imminent and whether to adjust the threshold for the in-crash sensors.

The ECM 12 is in electrical communication with a schematically indicated external airbag 13, which can be located in the vicinity of the front bumper and/or the windshield. Control signals are also received by a hood lifter 14 from the ECM 12. The deployment timing of the external airbag 13 and the hood lifter 14 can be adjusted when an impact is detected by the in-crash sensors, thereby reducing the potential impact for a pedestrian.

Further control signals that can adjust the deployment timing of additional expandable structures (not shown) based on the radar or vision output and the in-crash sensor output, can be transmitted by the ECM 12, which is in electrical communication with such expandable structures. Examples of additional expandable structures include safety devices, such as, expanding bumpers or external airbags covering the windshield and/or the A-pillars on either side thereof, The deployment of one or more of the expandable structures can be timed to better manage the effect of the expandable structure, in response to the type, bearing or closing velocity of an object about to impact the vehicle 9 when an impact is detected by the in-crash sensors.

Although, specific examples are provided above it is readily contemplated in accordance with the present invention, that one or all of the measurements provided by each of the sensors may be used in adjusting various deployment characteristics of a safety device as required.

For instance, it can be desirable to trigger a number of safety devices in sequence. One example of sequentially triggered devices can be a pyrotechnical hood lifter that is triggered before a pedestrian protection airbag for the windshield, as a pedestrian will often impact the hood prior to the windshield. The order and timing of a triggering sequence is determined by the ECM 12 in response to the type, bearing and closing velocity of an object about to impact the vehicle 9 when an impact is detected by the in-crash sensors.

According to the invention, information obtained from the pre-crash sensors yield valuable data for deploying an external airbag. In order to avoid incorrect deployment of the external airbag and other parts of the safety system it is desirable to reduce "false-positive" (FP) indications and increase "true-positive" (TP) indications from the sensors and the ECM 12. This is achieved by combining the information from the pre-crash sensors and the in-crash sensors. Information from the pre-crash sensors is used for setting a threshold for the in-crash sensor system. This will be described further below.

The radar sensor 10 analyzes a radio frequency signal reflected off an object to obtain a range measurement, a closing velocity, and a radar cross section. A time of impact estimate is calculated based on range measurement and the closing velocity. The range measurement is the distance between the object and vehicle 9. The radar sensor 10 provides distance information with high accuracy, typically within 5 cm. The closing velocity is a measure of the relative speed between the object and the vehicle 9. The time of impact estimate is compared with the necessary time to deploy the safety device, such as an external air bag. Typically deployment time of an external airbag is between 200 ms and 30 ms. In addition, the range measurement is compared with the necessary clearance distance from the vehicle 9 to deploy the safety device. Typically clearance distance for an external air bag is between 100 mm to 800 ms. The closing velocity is also used to determine the severity of impact. High closing velocities are associated with a more severe impact, while lower closing velocities are associated with a less severe impact.

The radar cross section is a measure of the strength of the reflected radio frequency signal. The strength of the reflected signal is generally related to the size and shape of the object. The size and shape is used to access the threat of the object. The ECM 12 processes the time of impact, severity of impact, and threat assessment to provide a radar output signal.

The vision sensor 11 provides for a vision range measurement, a bearing valve means for determining the angular deviation from a longitudinal axis through the center of the vehicle, means for determining the bearing rate (the rate of change of angular deviation), and means for determining the physical size of the object. These measurements allow the ECM 12 to provide a vision sensor output signal.

The ECM 12 uses one or both of the radar and vision output signals to perform a classification of the object in order to provide a pre-crash sensor output signal indicating that;
1) a correct object has been identified, i.e. a pedestrian, cyclist, etc.
2) an incorrect object has been identified, i.e. a non-pedestrian object; or
3) no object has been identified.

Similarly, by processing the information from one or more contact sensors 16, such as accelerometers or pressure sensors for detecting an actual impact, the ECM 12 can provide an in-crash sensor output signal indicating that;
i) a correct object has been identified, i.e. a pedestrian, cyclist, etc.
ii) an incorrect object has been identified, i.e. a non-pedestrian object; or
iii) no object has been identified.

Figure 2:
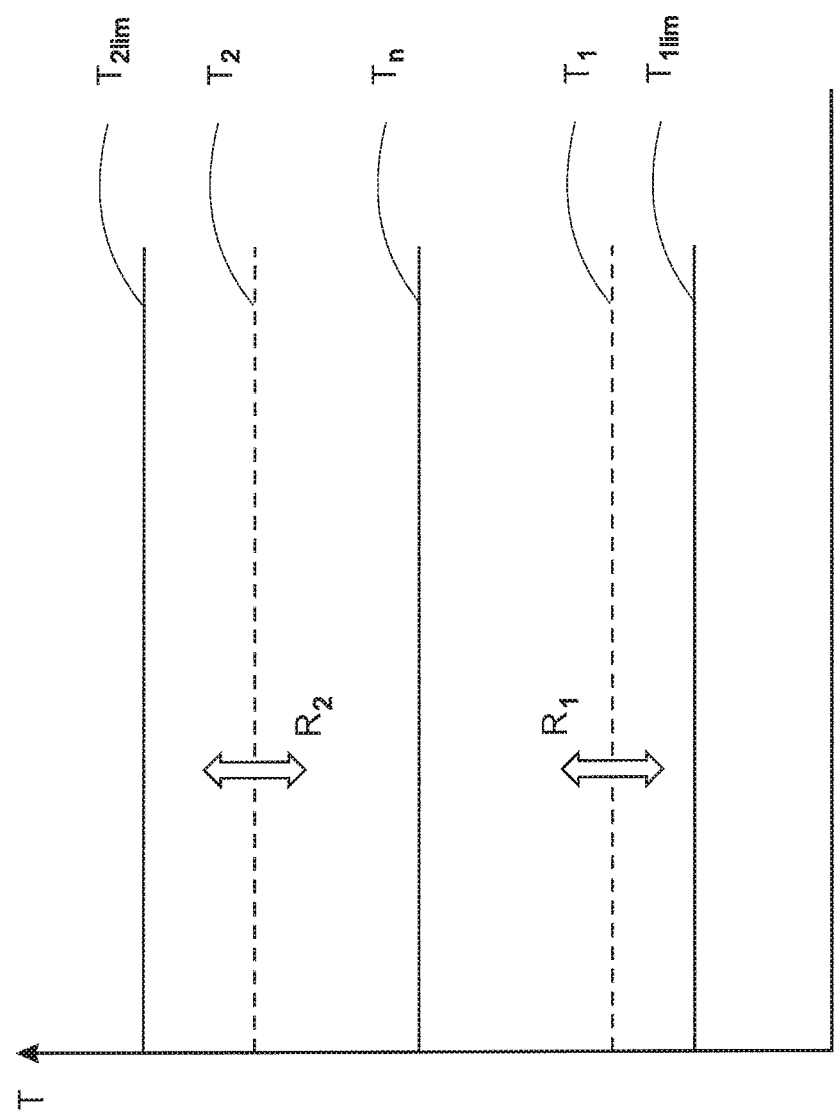
FIG. 2 shows a schematic diagram indicating threshold levels for different situations.

FIG. 2 shows a schematic diagram indicating possible threshold levels for different situations. In response to the pre-crash sensor output signal, the ECM 12 described above performs a classification of a detected object in order to set a desired threshold T1, T2 for the in-crash sensor system as a function of the object classification.

The pre-crash sensor output signal can be classified to indicate one of the following situations:
Case 1) a correct object has been identified, i.e. a pedestrian, cyclist, etc;
Case 2) an incorrect object has been identified, i.e. a non-pedestrian object; or
Case 3) no object has been identified.

According to the invention, the ECM 12 is arranged to set a threshold T1, T2 relative to a nominal threshold Tn, as a function of a first signal indicating a particular object classification. In this context, the nominal threshold Tn is a stored threshold that is used by the ECM 12 when no input is available from the active sensor systems. Further, the device is arranged to interpolate the set threshold between the nominal threshold Tn and an upper or a lower threshold limit value T1*lim*, T2*lim* as a function of the probability of accurate classification for the first signal. The ECM 12 is then arranged to compare a second signal A2, transmitted to the ECM 12 from the in-crash sensor system, with the set threshold T1, T2, whereby the external safety system is activated if the set threshold T1, T2 is exceeded.

According to a first alternative example, the ECM 12 is arranged to set a first threshold T1 equal to a minimum threshold limit value T1*lim* if the probability of accurate classification has a maximum value, as a function of the first signal indicating that an object classified as a pedestrian is detected. In this case, the classification has been deemed to have a probability of 100%, or near 100% (e.g. 95-100%), and the object is classified as a pedestrian with certainty or at least with a very high degree of certainty.

According to an alternative first example, the ECM 12 is arranged to set a first threshold T1 equal to a minimum threshold limit value T1*lim*, as a function of a first signal A1 indicating no object detected.

According to a second alternative example, the ECM 12 is arranged to set a first threshold T1 higher than the minimum threshold limit value T1*lim* if the probability of accurate classification is between a minimum and a maximum value, as a function of the first signal indicating no object detected or that an object classified as a possible pedestrian is detected. In this case the ECM 12 has set a first threshold T1 interpolated between the nominal threshold Tn and the minimum threshold limit value T1*lim*, as indicated with a dashed line in FIG. 2. Here the classification indicates that it is probable that an object classified as a pedestrian has been detected. Depending on the degree of probability of the classification, the first threshold T1 is interpolated as a linear function between the nominal threshold Tn and the minimum threshold limit value T1*lim*, as indicated by the arrow R1 in FIG. 2.

According to a third alternative example, the ECM 12 is arranged to set a second threshold T2 equal to a maximum threshold limit T2*lim* value if the probability of accurate classification has a maximum value, as a function of the first signal A1 indicating that an object classified as a non-pedestrian is detected. In this case, the classification has been deemed to have a probability of 100%, or near 100% (e.g. 95-100%), and the object is classified as a non-pedestrian with certainty or at least with a very high degree of certainty.

According to a fourth alternative example, the ECM 12 is arranged to set a second threshold T2 lower than the maximum threshold limit value T2*lim* if the probability of accurate classification between a minimum and a maximum value, as a function of the first signal A1 indicating that an object classified as a possible non-pedestrian is detected. Depending on the degree of probability of the classification, the second threshold T2 is interpolated as a linear function between the nominal threshold Tn and the maximum threshold limit value T2*lim*, as indicated by the arrow R2 in FIG. 2.

According to a fifth alternative example the ECM 12 is arranged to set a threshold equal to the nominal threshold Tn, as a function of a first signal A1 indicating that no input is available from the pre-crash sensor or pre-crash sensor failure. This situation can occur, for instance, for a sensor which can only detect some types of objects but does not have a generic object classification, like mono-vision system In this case, the input A2 from the in-crash sensors will be decisive for the triggering of the external safety system.

According to a further alternative example the device is arranged to set a threshold equal to a minimum threshold limit value T1*lim*, as a function of a first signal A1 indicating no object detected. This situation can occur, for instance, for a sensor where any object impacting the car will normally be seen, such as a radar system. For such systems, a standing object in the path of the vehicle is very likely to be seen. However, because such sensors have a limited field of view a moving target passing in front of the vehicle may be hit before being detected by a sensor. In this case, it can be assumed that if the object was not seen, it is because it has moved out in front of the vehicle. Such an object is likely to be a pedestrian. Therefore a threshold equal to a minimum threshold limit value should be set.

Figure 3:
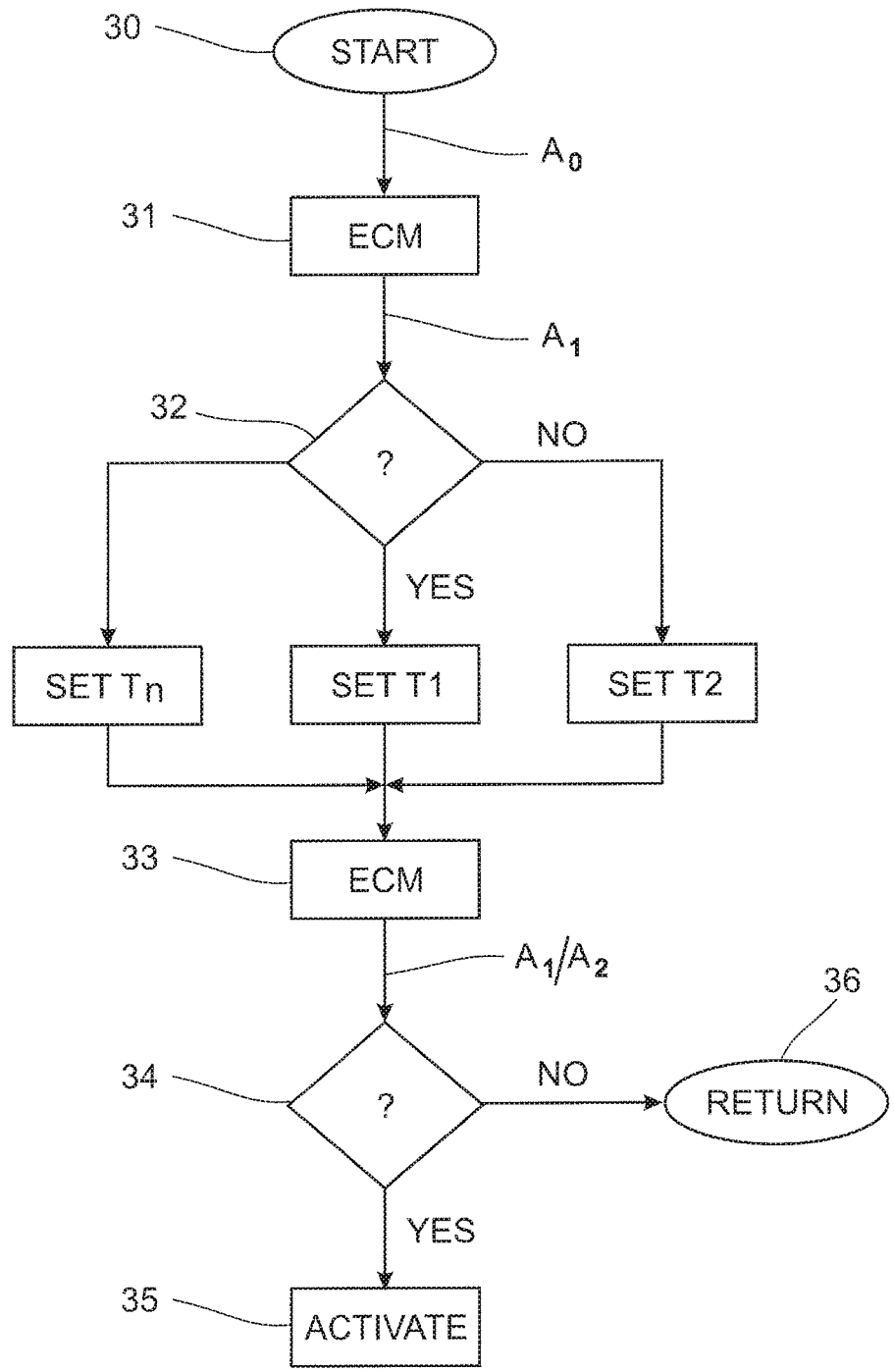
FIG. 3 shows a schematic flow chart related to the processing of the sensor output signals of the safety system.

FIG. 3 provides a signal and decision flow chart related to the processing of the pre-crash sensor output signal and the in-crash sensor output signal to determine if the safety system should be activated. The process is started at step 30 when the ECM 12 receives multiple input signals comprising a radar output signal 20, a vision output signal 22 and a contact output signal 24,. In a first step 31 the ECM 12 performs an object classification of the output signals 20, 22 from the pre-crash sensor system to generate a first signal in the form of a pre-crash output signal A1. In a second step 32 the pre-crash output signal A1 is used for setting a threshold for the in-crash sensor system based on whether an object is detected or not. If it is determined that a correct object or no object is detected (YES) then a first threshold T1 is set for the in-crash sensor system. The setting of the first threshold is described above. If it is determined that an object has been detected, but not a correct object (NO) then a second, relatively higher threshold T2 is set for the in-crash sensor system. This higher threshold T2 for the in-crash sensor system is used when the detected object is non-pedestrian. The setting of the first threshold is described above.

If it is determined that no input is available from the pre-crash sensors, or that a sensor failure has occurred, then the ECM 12 is arranged to set a threshold equal to the nominal threshold Tn as described above.

In a third step 33 the ECM 12 processes the output signal 24 from the in-crash sensor system to generate a second signal in the form of an in-crash output signal A2. In a fourth step 34 the in-crash output signal A2 is combined with the pre-crash output signal A1 to determine whether to activate (YES) the safety system or not (NO). The control algorithm of the ECM 12 evaluates the following conditions for the in-crash output signal A2 combined with the pre-crash output signal A1 before activating the safety system:

EXAMPLE 1

If it is determined that the in-crash output signal A2 indicates that a correct object or no object is detected, when the pre-crash output signal A1 has indicated that a correct object is detected (YES), then the safety system is activated at step 35.

EXAMPLE 2

If it is determined that the in-crash output signal A2 indicates that an object has been detected, but not a correct object, when the pre-crash output signal A1 has indicated that no object is detected (YES), then the safety system is activated at step 35.

EXAMPLE 3

If it is determined that the in-crash output signal A2 indicates that a correct object is detected, when the pre-crash output signal A1 has indicated that an object has been detected, but not a correct object (YES), then the safety system is activated at step 35.

The ECM 12 also detects that a threshold has been exceeded before activating the safety system. In the first two cases the first, relatively lower threshold T1 is used for the in-crash sensor system, as the combined sensor decision is deemed to be a true positive (TP) triggering. In the third case the second, relatively higher threshold T2 is used for the in-crash sensor system, as the combined sensor decision is deemed to be a false positive (FP) triggering. Using a higher threshold T2 for the in-crash sensor system will increase the probability of a correct activation of the safety system. If none of the above cases are detected (NO), then the process returns 36 to start 30.

The present invention provides for an algorithm to take into account the speed between the vehicle and the object, such as a pedestrian, using a pre-crash sensor system, in order to precisely to infer the impacting object from the impact signal of an in-crash sensor system. The device according to the invention when used for activating an actuator system for protecting a pedestrian, a cyclist, or similar has the advantage that the algorithm used for activating the actuator system uses input signals from both a pre-crash sensor system and an in-crash sensor system. The signal A1 of the pre-crash sensor system is used for determining a threshold level T for the in-crash sensor system to generate a triggering signal for the external safety system. The signal A2 of the in-crash sensor system is compared to a threshold T1,T2 determined by the pre-crash sensor system, whereupon the signal A2 of the in-crash sensor system will be decisive when determining whether to trigger the external safety system or not. For instance, when there is no pre-crash input signal A1, e.g. due to a malfunction or if there is no object to detect, then a nominal threshold Tn is set. If the in-crash output signal A2 indicates that a correct object is detected (YES) then the external safety system is triggered.

According to the invention it is also possible to take into consideration the relative speed into account in evaluating the signal from the in-crash sensor system.

Figure 4:
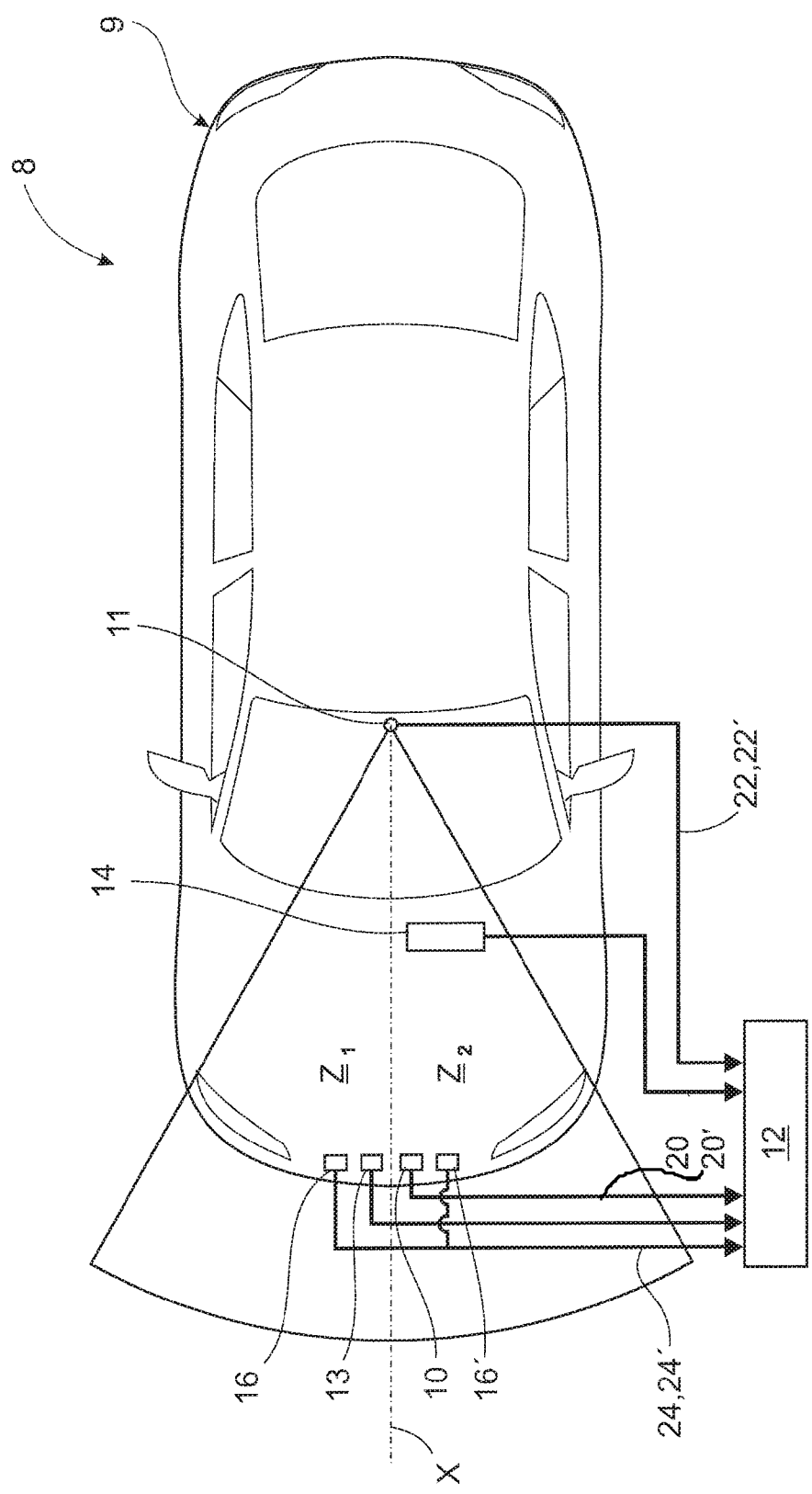
FIG. 4 shows a schematic plan view of a vehicle provided with an alternative embodiment of the invention.

FIG. 4 shows a schematic plan view of a vehicle provided with an alternative safety system according to the invention. Using the reference numerals of FIG. 1, FIG. 3 shows a sensor system 8 is shown with an associated vehicle 9. The sensor system 8 is configured for a forward looking application and has the ability to sense an approaching object and prepare the vehicle 9 for an impact with a pedestrian, a cyclist or similar. In this example the application is shown with single sensors for radar and vision, respectively, but it is also possible to provide multiple sensors having overlapping fields of view.

In this example, the total field of view of the sensor 11 is less than 180° and is split into two zones Z1, Z2 covering the right and left side of the vehicle, respectively. In this example, both zones Z1, Z2 extend a predetermined angle to the right and left relative to a datum line X corresponding to a central longitudinal axis through the vehicle. The sensor system 8 includes a radar sensor 10 which receives a radio frequency signal, preferably in the microwave region emanating from an antenna (not shown). The radar sensor 10 provides radar output signals 20, 20' from each zone Z1, Z2 to an electronic control module (ECM) 12. A vision sensor 11 is preferably mounted to an upper portion of the vehicle 9, such as, along the windshield header aimed forward to provide vision information. The vision sensor 11 provides individual vision output signals 22, 22' from each zone Z1, Z2 to the ECM 12.

The sensor system 8 further includes one or more contact sensors 16, 16' for each zone Z1, Z2 (one shown), such as accelerometers or pressure sensors, for detecting an actual impact. Each zone Z1, Z2 is provided with individual contact sensors 16, 16' which provide contact output signals 24, 24' from each zone Z1, Z2 to the ECM 12. FIG. 3 only shows one contact sensor per zone for reasons of clarity, but each of the indicated contact sensors 16 and 16' can represent multiple sensors distributed across the front of the vehicle. The contact sensors 16, 16' are also referred to as in-crash sensors. The radar sensor 10 and the vision sensor 11 are also referred to as pre-crash sensors. The ECM 12 combines radar output signal 20, 20', the vision output signal 22, 22' and contact output signals 24, 24' to determine if a collision is imminent in one or both zones Z1, Z2 and whether to adjust the threshold for the in-crash sensors in the respective zone.

The ECM 12 is in electrical communication with a schematically indicated external airbag 13. For reasons of clarity, only one airbag 13 is shown although the safety system can include individually controllable airbags in the respective zones, which airbags can be located in the vicinity of the left and right portions of the front bumper, the left and right portions of the windshield. Also, inflatable structures along each A-pillar can be provided. Control signals are also received by a hood lifter 14 from the ECM 12. The deployment timing of the external airbags 13 in the respective zone Z1, Z2 and the hood lifter 14 can be adjusted when an impact is detected by the in-crash sensors, thereby reducing the potential impact for a pedestrian.

Further control signals that can adjust the deployment timing of additional expandable or inflatable structures (not shown) based on the radar or vision output and the in-crash sensor output, can be transmitted by the ECM 12, which is in electrical communication with such expandable structures. Examples of additional expandable structures include safety devices, such as, expanding bumpers or external airbags covering the windshield and/or the A-pillars on either side thereof, The deployment of one or more of the expandable structures can be individually timed for one or more zones to better manage the effect of the expandable structure, in response to the type, bearing or closing velocity of an object about to impact the vehicle 9 when an impact is detected by the in-crash sensors.

Although, specific examples are provided above it is readily contemplated in accordance with the present invention, that one or all of the measurements provided by each of the sensors may be used in adjusting various deployment characteristics of a safety device as required.

For instance, it can be desirable to trigger a number of safety devices in sequence. One example of sequentially triggered devices can be a pyrotechnical hood lifter that is triggered before a pedestrian protection airbag for the windshield, as a pedestrian will often impact the hood prior to the windshield. The order and timing of a triggering sequence is determined by the ECM 12 in response to the type, bearing and closing velocity of an object about to impact the vehicle 9 when an impact is detected by the in-crash sensors.

It can also be desirable to trigger a number of safety devices individually in different zones. The pre-crash sensor system is arranged to monitor all zones and will issue an individual first signal for each zone. The external safety system in each zone can be activated individually if the set threshold for a particular zone is exceeded. The use of multiple zones allows for multiple target tracking. In this way it is possible to activate the external safety system for a detected first target, such as a pedestrian, in one zone while preventing actuation for a detected second target, such as a fixed object, in a second zone.

As in the example described for FIG. 1 above, information obtained from the pre-crash sensors yield data for deploying one or more external airbag. In order to avoid incorrect deployment of the external airbag and other parts of the safety system it is desirable to reduce "false-positive" (FP) indications and increase "true-positive" (TP) indications from the sensors and the ECM 12. This is achieved by combining the information from the pre-crash sensors and the in-crash sensors. Information from the pre-crash sensors is used for setting a threshold for the in-crash sensor system.

The radar sensor 10 analyzes a radio frequency signal reflected off an object to obtain a range measurement, a closing velocity, and a radar cross section. For the example shown in FIG. 3, this analysis is performed for each zone Z1, Z2 and an output signal is provided for the respective zone. A time of impact estimate for the respective zone is calculated based on range measurement and the closing velocity. The range measurement is the distance between an object and vehicle 9. The radar sensor 10 provides distance information with high accuracy, typically within 5 cm. The closing velocity is a measure of the relative speed between the object and the vehicle 9. The time of impact estimate is compared with the necessary time to deploy a safety device, such as an external air bag, in one or more zones. Typically deployment time of an external airbag is between 200 ms and 30 ms. In addition, the range measurement is compared with the necessary clearance distance from the vehicle 9 to deploy a safety device in one or more zones. Typically clearance distance for an external air bag is between 100 mm to 800 ms. The closing velocity is also used to determine the severity of impact. High closing velocities are associated with a more severe impact, while lower closing velocities are associated with a less severe impact.

The radar cross section is a measure of the strength of the reflected radio frequency signal. The strength of the reflected signal is generally related to the size and shape of the object. The size and shape is used to access the threat of the object. The ECM 12 processes the time of impact, severity of impact, and threat assessment to provide a radar output signal.

The vision sensor 11 provides means for a vision range measurement, a bearing valve means for determining the angular deviation from a longitudinal axis through the center of the vehicle, means for determining the bearing rate (the rate of change of angular deviation), and means for determining the physical size of the object. These measurements allow the ECM 12 to provide a vision sensor output signal 22, 22' for each zone Z1, Z2.

As described in connection with FIG. 4 above, the ECM 12 uses one or both of the radar and vision output signals 20, 21'; 22,22' to perform a classification of the object in order to provide a pre-crash sensor output signal. The object classification is performed individually for each zone Z1, Z2, based on the output signals from the pre-crash sensors and in-crash sensors covering the respective zone. For each zone, a pre-crash sensor output signal is provided, indicating that;

Case 1) a correct object has been identified, i.e. a pedestrian, cyclist, etc;

Case 2) an incorrect object has been identified, i.e. a non-pedestrian object; or Case 3) no object has been identified.

Similarly, by processing the information from one or more contact sensors 16 in each zone Z1, Z2, such as accelerometers or pressure sensors for detecting an actual impact, the ECM 12 can provide an in-crash sensor output signal for the respective zone indicating that;

Case 1) a correct object has been identified, i.e. a pedestrian, cyclist, etc;

Case 2) an incorrect object has been identified, i.e. a non-pedestrian object; or Case 3) no object has been identified.

FIG. 3 provides a signal and decision flow chart related to the processing of the pre-crash sensor output signal and the in-crash sensor output signal to determine if the safety system should be activated, by setting suitable contact thresholds in response to the output signals. The setting of thresholds is performed individually for each zone, based on the output signals from the pre-crash sensors and in-crash sensors covering the respective zone. Hence, the example shown in FIG. 4 uses the same process for setting thresholds as the example shown in FIGS. 1 and 3, with the difference that the process is performed simultaneously for each zone to set individual thresholds for the respective zones.

The invention is not limited to the embodiments described above, but can be varied within the scope of the claims. For instance, the examples given for the operative speed range and the suggested minimum speed threshold.

While the above description constitutes the preferred embodiment of the present invention, it will be appreciated that the invention is susceptible to modification, variation and change without departing from the proper scope and fair meaning of the accompanying claims.

The invention claimed is:

1. A vehicle safety system comprising:
an external safety system configured to protect a pedestrian in a field of view, and a device including an electronic control module configured to activate the external safety system the device being connected to a pre-crash sensor system configured to detect an object and an in-crash sensor system;
the device being configured to perform an object classification of a first signal from the pre-crash sensor system, wherein the object classification is based on a value generated as a function of the first signal generated by the pre-crash system;
wherein when the value is between a first threshold and a nominal threshold, the object is classified as a pedestrian, wherein when the value is between a second threshold and the nominal threshold the object is classified as a non-pedestrian, wherein the nominal threshold is greater than the first threshold and less than the second threshold;
the device being configured to set the first threshold, the first threshold being equal to a value generated as a function of a signal produced when the object is a pedestrian;
the device is configured to set a second threshold, the second threshold being equal to a value generated as a function of a signal produced when the object is a non-pedestrian;
wherein the nominal threshold is a stored threshold that is utilized by the electronic control module when no input is available from the sensor systems;
the device is configured to interpolate the set first or second threshold between the nominal threshold and a threshold limit value as a function of a probability of an accurate classification for the first signal;
the device is configured to compare a second signal from the in-crash sensor system with the set first or second threshold, whereby the external safety system is activated when the set first or second threshold is exceeded;
wherein the field of view is forward of a vehicle having the vehicle safety system and is split into two or more zones that radiate radially from a forward end of the vehicle; and
the device is configured to determine first and second thresholds for each zone as a function of a first signal from the pre-crash sensor system.

2. The vehicle safety system according to claim 1, further comprising that the device is configured to set the first threshold equal to a minimum of the threshold limit value when the probability of accurate classification has a maximum value, as a function of the first signal indicating that an object classified as the pedestrian is detected.

3. The vehicle safety system according to claim 1, further comprising that the device is configured to set the first threshold higher than a minimum of the threshold limit value when the probability of accurate classification is between a minimum and a maximum value, as a function of the first signal indicating no object or that an object classified as a possible pedestrian is detected.

4. The vehicle safety system according to claim 1, further comprising that the device is configured to set a second threshold equal to a maximum of the threshold limit value when the probability of accurate classification has a maximum value, as a function of the first signal indicating that an object classified as a non-pedestrian is detected.

5. The vehicle safety system according to claim 1, further comprising that the device is configured to set the second threshold lower than a maximum of the threshold limit value when the probability of accurate classification between a minimum and a maximum value, as a function of the first signal indicating that an object classified as a possible non-pedestrian is detected.

6. The vehicle safety system according to claim 1, further comprising that the device is configured to set the first or the second threshold equal to the nominal threshold, when no pre-crash sensor input is detected or pre-crash sensor failure is detected.

7. The vehicle safety system according to claim 1, further comprising that the device is configured to set a value equal to a minimum of the threshold limit value, as a function of a first signal indicating no object detected.

8. The vehicle safety system according to claim 1 further comprising that the probability of accurate classification is determined by the device is a function of the first signal and at least one additional detected vehicle related parameter.

9. The vehicle safety system according to claim 8, further comprising that the at least one additional detected vehicle related parameter is a detected brake actuation.

10. The vehicle safety system according to claim 8 further comprising that the at least one additional detected vehicle related parameter is a detected steering wheel actuation.

11. The vehicle safety system according to claim 1 further comprising that the nominal threshold is a linear function of the probability of accurate classification between maximum and minimum threshold limit values.

12. The vehicle safety system according to claim 1 further comprising that the probability of accurate classification of the first signal is a function of the sensor's confidence level.

13. The vehicle safety system according to claim 1 further comprising that the pre-crash sensor system has a field of view less than 180°.

14. The vehicle safety system according to claim 1 further comprising that the external safety system comprises multiple pyrotechnic components arranged to be activated sequentially.

15. The vehicle safety system according to claim 1 further comprising that the external safety system comprises at least a pyrotechnic hood lifter.

16. The vehicle safety system according to claim 1 further comprising that the external safety system comprises at least one pedestrian protection airbag.

17. The vehicle safety system according to claim 1, further comprising that the external safety system in each zone is activated individually when the set first or second threshold is exceeded.

18. A device including an electronic control unit configured to activate an external safety system for protecting a pedestrian in a field of view, the device being connected to a pre-crash sensor system configured to detect an object and an in-crash sensor system, comprising the device configured:
    to perform an object classification of a first signal from the pre-crash sensor system, wherein the object classification is based on a value generated as a function of the first signal, wherein when the value is between a first threshold and a nominal threshold the object is classified as a pedestrian, wherein when the value is between a second threshold and the nominal threshold the object is classified as a non-pedestrian, wherein the nominal threshold is greater than the first threshold and less than the second threshold;
    to set the first threshold indicating, the first threshold being equal to a value generated as a function of a signal produced when the object is a pedestrian;
    to set the second threshold, the second threshold being equal to a value generated as a function of a signal produced when the object is a pedestrian;
    wherein the nominal threshold is a stored threshold that is utilized by the electronic control unit when no input is available from the sensor systems;
    to interpolate the set first or second threshold between the nominal threshold and a threshold limit value as a function of a probability of accurate classification for the first signal;
    to compare a second signal from the in-crash sensor system with the set first or second threshold, the device being activated when the set first or second threshold is exceeded;
    wherein the field of view is forward of a vehicle having the vehicle safety system and is split into two or more zones that radiate radially from a forward end of the vehicle; and
    the device is configured to determine individual first and second thresholds for each zone as a function of a first signal from the pre-crash sensor system.

19. The device according to claim 18, further comprising the device configured to set the first threshold equal to a minimum of the threshold limit value when the probability of accurate classification has a maximum value, as a function of the first signal indicating that an object classified as a pedestrian is detected.

20. The device according to claim 18, further comprising the device configured to set the first threshold higher than a minimum of the threshold limit value when the probability of accurate classification is below the maximum value, as a function of the first signal indicating no object or that an object classified as a possible pedestrian is detected.

21. The device according to claim 18, further comprising the device configured to set the second threshold equal to a maximum of the threshold limit value when the probability of accurate classification has a maximum value, as a function of the first signal indicating that an object classified as a non-pedestrian is detected.

22. The device according to claim 18, further comprising the device configured to set the second threshold lower than a maximum of the threshold limit value when the probability of accurate classification has a maximum value, as a function of the first signal indicating that an object classified as a possible non-pedestrian is detected.

23. A method for activating an external safety system for protecting a pedestrian in a field of view which system of a type having a device including an electronic control unit for activating the external safety system, the device being connected to a pre-crash sensor system and an in-crash sensor system and being arranged to perform an object classification of a first signal from the pre-crash sensor system configured to detect an object, the method comprising the steps of:
    performing an object classification of a first signal from the pre-crash sensor system, wherein the object classification is based on a value generated as a function of the first signal, wherein when the value is between a first threshold and a nominal threshold the object is classified as a pedestrian, wherein when the value is between a second threshold and the nominal threshold the object is classified as a non-pedestrian;
    wherein the nominal threshold is greater than the first threshold and less than the second threshold and is a stored threshold that is utilized by the electronic control unit when no input is available from the sensor system;
    setting the first threshold, the first threshold being equal to a value generated as a function of a signal produced when the object is a pedestrian;
    setting the second threshold, the second threshold being equal to a value generated as a function of a signal produced when the object is a pedestrian;
    interpolating the set value between the nominal threshold and a threshold limit value as a function of a probability of accurate classification for the first signal;
    comparing a second signal from the in-crash sensor system with the first or second threshold, and activating the device when the set first or second threshold is exceeded;
    using an external safety system comprising the field of view that is forward of a vehicle having the vehicle safety system and is split into two or more zones that radiate radially from a forward end of the vehicle, each provided with a pre-crash sensor system, and performing an object classification of the first signal from the pre-crash sensor system; and
    determining an individual first or second threshold for each zone, as a function of the first signal from the pre-crash sensor system.

24. The method according to claim 23, further comprising setting the first threshold equal to a minimum threshold limit value when the probability of accurate classification has a maximum value, as a function of the first signal indicating that an object classified as a pedestrian is detected.

25. The method according to claim 23, further comprising setting the first threshold higher than a minimum threshold limit value when the probability of accurate classification is below the maximum value, as a function of the first signal indicating no object or that an object classified as a possible pedestrian is detected.

26. The method according to claim 23, further comprising setting the second threshold equal to a maximum threshold limit value when the probability of accurate classification has a maximum value, as a function of the first signal indicating that an object classified as a non-pedestrian is detected.

27. The method according to claim 23, further comprising setting the second threshold lower than a maximum of the threshold limit value when the probability of accurate classification has a maximum value, as a function of the first signal indicating that an object classified as a possible non-pedestrian is detected.

28. The method according to claim 23, further comprising setting the first or second threshold equal to the nominal threshold, when no pre-crash sensor input is detected or when pre-crash sensor failure is detected.

29. The method according to claim 23, further comprising setting the first or second threshold equal to a minimum threshold limit value, as a function of the first signal indicating no object detected or pre-crash sensor failure.

30. The method according to claim 23 further comprising determining the probability of accurate classification as a function of the first signal and at least one additional detected vehicle related parameter.

31. The method according to claim 30, further comprising the at least one additional detected vehicle related parameter is a detected brake actuation.

32. The method according to claim 30 further the at least one additional detected vehicle related parameter is a detected steering wheel actuation.

33. The method according to claim 23 further comprising determining the first or the second threshold as a linear function of the probability of accurate classification between maximum and minimum of the threshold limit values.

34. The method according to claim 23 further estimating the probability of accurate classification as a function of the sensor's confidence level.

35. The method according to claim 23, further comprising that the external safety system in each zone is activated individually when the set threshold is exceeded.

* * * * *